United States Patent [19]

Ogawa

[11] Patent Number: 5,339,199
[45] Date of Patent: Aug. 16, 1994

[54] STILL VIDEO DEVICE WITH SELECTABLE SUCCESSIVE ERASURE OF AUDIO AND/OR VIDEO TRACKS

[75] Inventor: Kimiaki Ogawa, Tokyo, Japan

[73] Assignee: Asahi Kogaku Kogyo Kabushiki Kaisha, Tokyo, Japan

[21] Appl. No.: 88,589

[22] Filed: Jul. 9, 1993

Related U.S. Application Data

[63] Continuation of Ser. No. 705,670, May 24, 1991, abandoned.

[30] Foreign Application Priority Data

May 25, 1990 [JP] Japan ................ 2-136526

[51] Int. Cl.⁵ ................ H04N 5/781; G11B 5/024
[52] U.S. Cl. ................ 360/35.1; 360/19.1; 360/60; 358/342; 358/906
[58] Field of Search ............ 360/19.1, 35.1, 60; 358/310, 335, 342, 344, 906

[56] References Cited

U.S. PATENT DOCUMENTS

| | | | |
|---|---|---|---|
| 4,725,902 | 2/1988 | Oda et al. | 360/66 |
| 4,814,904 | 3/1989 | Shigihara et al. | 360/66 |
| 4,816,935 | 3/1989 | Toizumi et al. | 360/66 |
| 4,879,609 | 11/1989 | Kozuki et al. | 360/66 |
| 4,982,291 | 1/1991 | Kurahashi et al. | 358/906 |
| 5,043,831 | 8/1991 | Muramoto et al. | 360/66 |
| 5,212,556 | 5/1993 | Ogawa | 358/335 |

FOREIGN PATENT DOCUMENTS

| | | |
|---|---|---|
| 271869 | 6/1988 | European Pat. Off. |
| 3440155 | 5/1985 | Fed. Rep. of Germany |
| 3607562 | 9/1986 | Fed. Rep. of Germany |
| 2659516 | 9/1991 | France |
| 1154303 | 6/1989 | Japan |
| 2225687 | 6/1990 | United Kingdom |
| 2235846 | 3/1991 | United Kingdom |
| 2242560 | 10/1991 | United Kingdom |

OTHER PUBLICATIONS

Makoto, Takayama; Patent Abstracts of Japan; Publication No. JP 1154303, vol. 13, No. 422 (P-933); Jun. 16, 1989.

*Primary Examiner*—Edward P. Westin
*Assistant Examiner*—Benjamin D. Driscoll
*Attorney, Agent, or Firm*—Sandler Greenblum & Bernstein

[57] ABSTRACT

A still video device includes a magnetic head for reproducing a signal recorded on a floppy disk, a first switch for commanding a successive erasing mode, and a second switch for designating a kind of signal to be erased. The successive erasing mode is set by the first switch so that only a video signal or an audio signal is successively erased from a series of tracks, the signal to be erased being determined by the second switch. The first switch may be an exposure correcting switch provided for correcting an exposure. The second switch may be a select switch provided for selecting an operation mode of the still video device, such as recording, reproduction, and erasing.

32 Claims, 6 Drawing Sheets

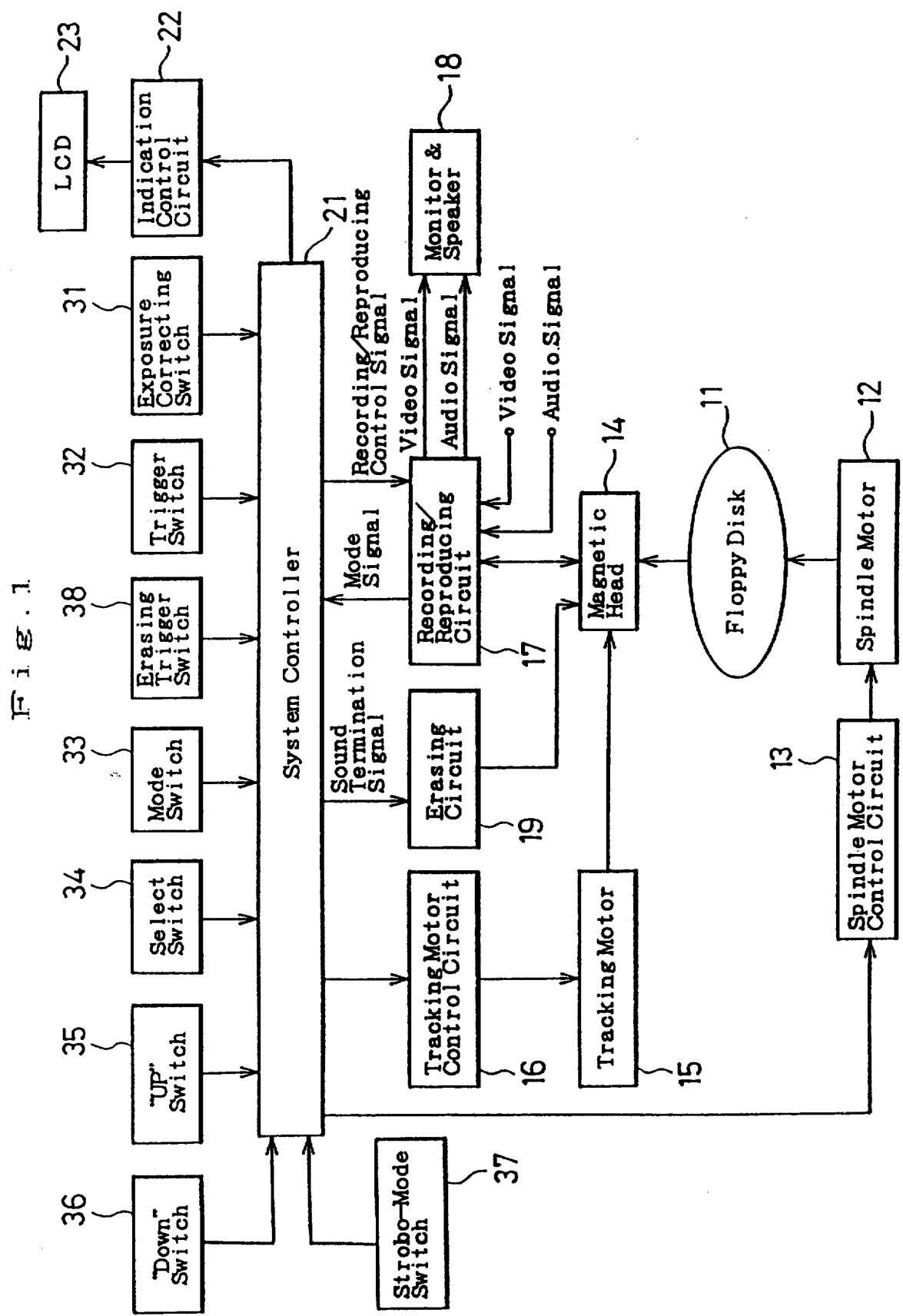

Normal Erasing

Normal Successive Erasing

Video Successive Erasing

Audio Successive Erasing (Normal Successive Erasing Mode)

Fig. 3C (Video Successive Erasing Mode)
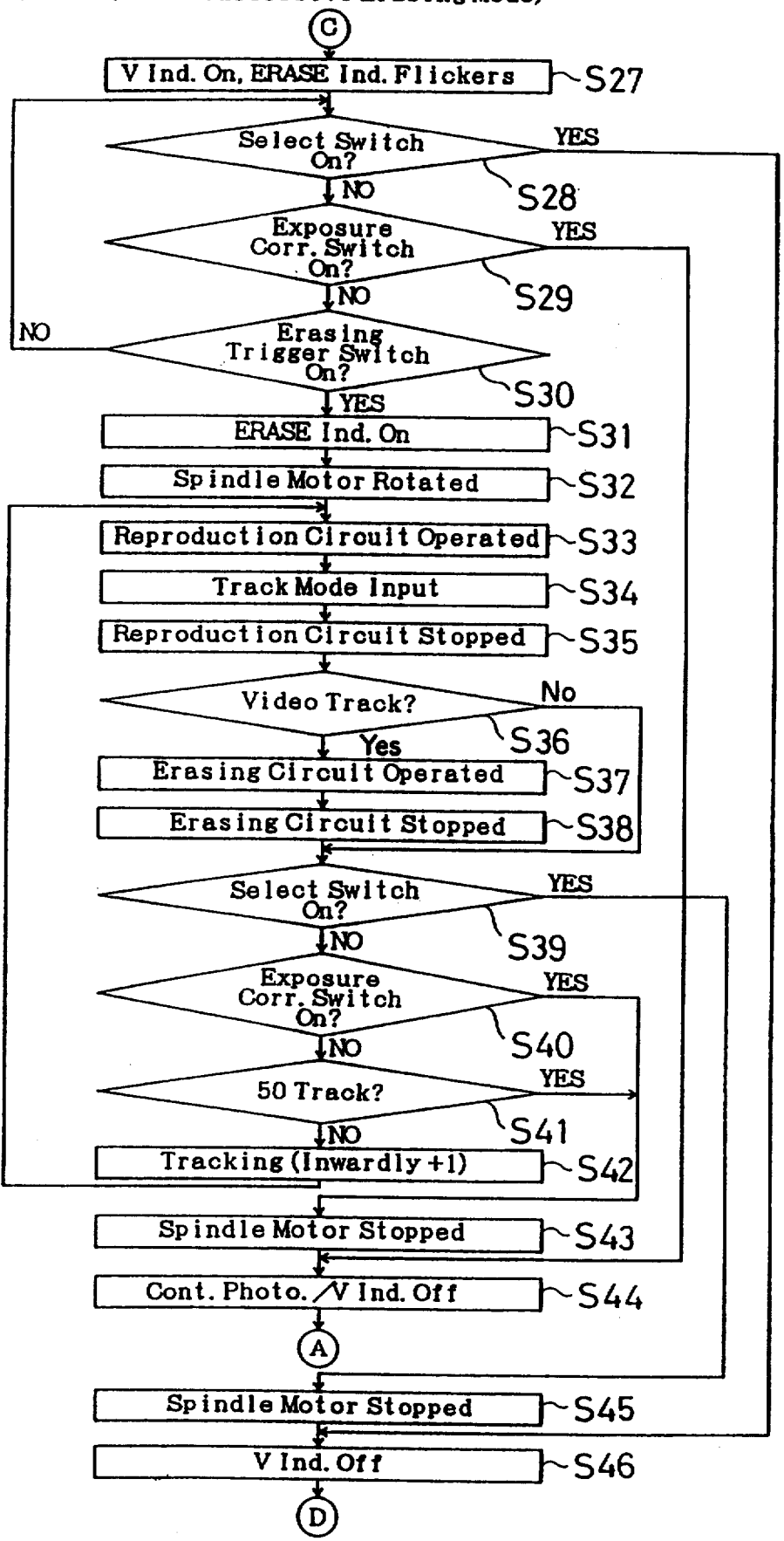

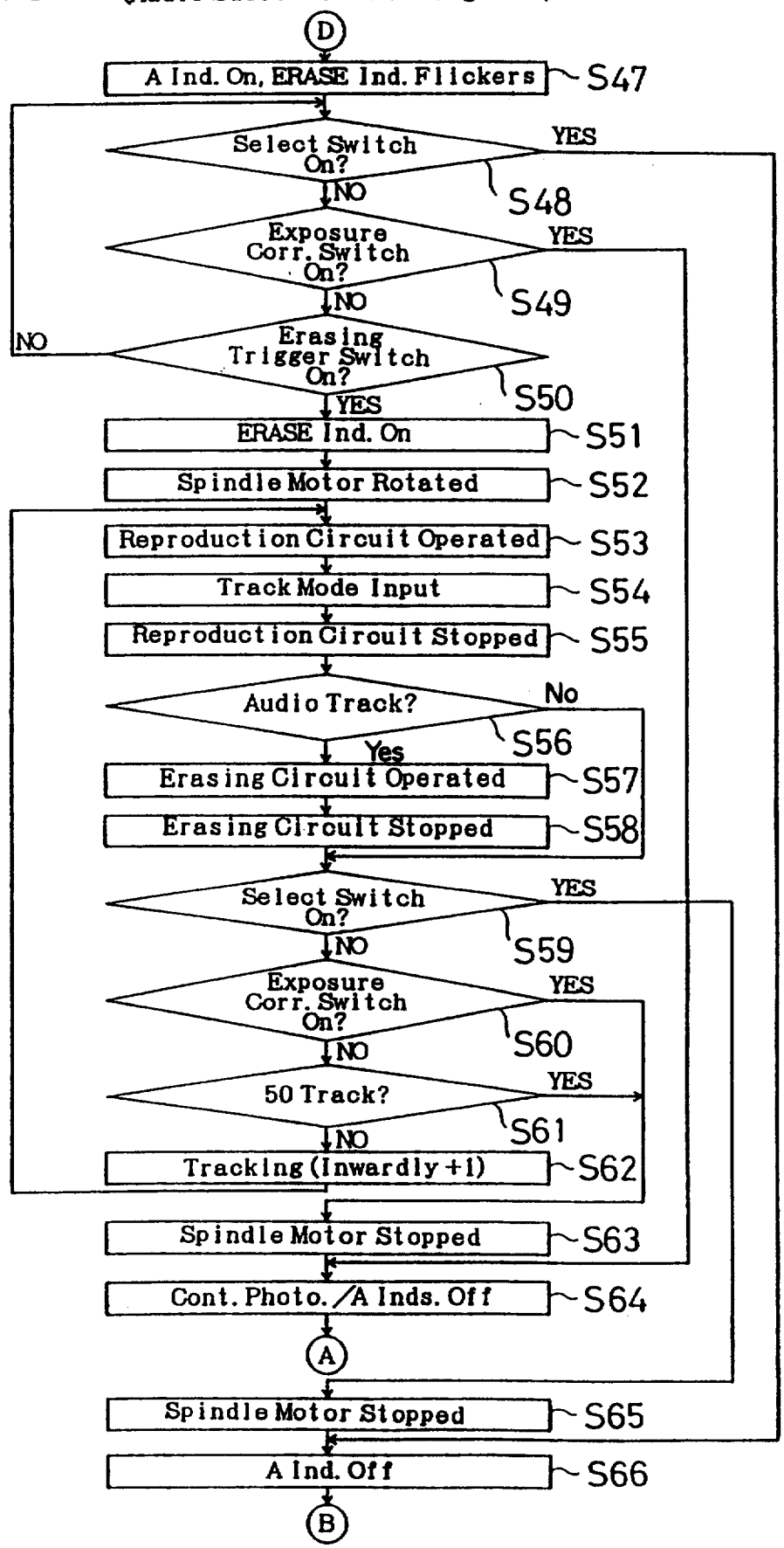
Fig. 3D (Audio Successive Erasing Mode)

STILL VIDEO DEVICE WITH SELECTABLE SUCCESSIVE ERASURE OF AUDIO AND/OR VIDEO TRACKS

This application is a continuation, of application Ser. No. 07/705,670, filed May 24, 1991, now abandoned.

BACKGROUND OF THE INVENTION

1. Field of the Invention

The present invention relates to a still video device by which a video signal and/or an audio signal are recorded in a magnetic disk, and these signals are reproduced.

2. Description of the Related Art

In a still video device, generally, a magnetic disk is used as a recording medium for storing a video signal and/or an audio signal. The magnetic disk is provided with a plurality of tracks concentrically formed on the magnetic disk, and the video signal and the audio signal are each recorded on a different track, respectively. Thereafter, in a conventional still video device, the signals recorded on each of the tracks are reproduced one track at a time.

In a conventional still video device, a signal stored in each track may only be erased, one at a time, i.e., more than one track cannot be successively erased, accordingly, when a plurality of tracks are to be erased, an erasing operation, in which each track is erased one by one, must be repeated. Therefore, when the user wishes to erase only a video signal or an audio signal, such an erasing operation must be separately carried out for each track, which is cumbersome.

SUMMARY OF THE INVENTION

Therefore, an object of the present invention is to provide a still video device in which a plurality of tracks storing a predetermined kind of signal can be erased.

According to the present invention, there is provided a still video device in which a recording medium is mounted, wherein the recording medium has a plurality of tracks in which different kinds of signals can be stored. The still video device comprises an erasing mechanism, a command mechanism, a designating mechanism, and a control mechanism. The erasing mechanism erases a signal recorded in a predetermined track of the recording medium; the command mechanism commands a successive erasing mode in which tracks storing the same kind of signal are successively erased; the designating mechanism designates what kind of signal recorded in the recording medium is to be erased; and the control mechanism controls the erasing mechanism so that, when the successive erasing mode is commanded by the command means, the erasing mechanism successively erases a plurality of tracks storing a kind of signal designated by the designating means.

Further, according to the present invention, there is provided a still video device comprising a disk in which a kind of signal recorded in each track is different. An erasing mechanism, a moving mechanism, a first switch, a second switch, and a control mechanism. The erasing mechanism are also provided erases a signal recorded in the disk; the moving mechanism moves the erasing mechanism to a predetermined track of the disk; the first switch is operated to command a successive erasing mode in which several tracks of the disk are successively erased; the second switch is operated to designate the kind of signal recorded in the disk to be erased; and the control mechanism controls the moving mechanism so that, when the successive erasing mode is commanded by the first switch, the erasing mechanism is successively positioned at a plurality of tracks in which a kind of signal designated by the second switch is recorded.

Furthermore, according to the present invention, there is provided a still video device in which a disk is mounted, the disk having tracks in which different kinds of signals can be stored, respectively. The signal is erased by a head provided in the device, and the head being is moved to a position corresponding to a predetermined track of the disk to thereby erase the signal. The still video device comprises a first switch, a second switch, and a moving mechanism. The first switch is operated to command a successive erasing mode in which several tracks of the disk are successively erased; the second switch is operated to designate the kind of signal recorded in the disk to be erased; and the moving mechanism moves the head so that, when the successive erasing mode is commanded by the first switch, the head is successively positioned at predetermined tracks, whereby only the predetermined signals designated by the second switch are erased.

BRIEF DESCRIPTION OF THE DRAWINGS

The present invention will be better understood from the description of the preferred embodiments of the invention set forth below, together with the accompanying drawings, in which:

FIG. 1 is a block diagram showing a construction of an embodiment of a still video device according to the present invention;

FIG. 3C is a flowchart showing the successive erasing operation for a video signal; and FIG. 3D is a flowchart showing the successive erasing operation for an audio signal.

DESCRIPTION OF THE PREFERRED EMBODIMENTS

Figure 2A:
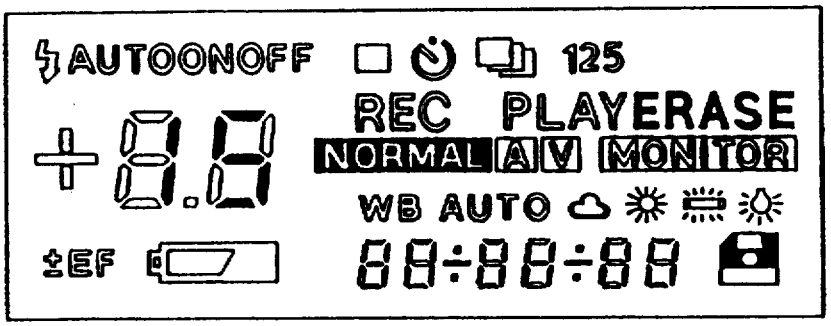
FIG. 2A is a view showing an indication by an LCD in a normal erasing operation for a video signal or an audio signal.

The present invention will now be described with reference to embodiments shown in the drawings.

FIG. 1 is a block diagram showing an arrangement of an embodiment of a still video device according to the present invention.

A floppy disk, i.e., a magnetic disk 11, is used as a recording medium of this still video device, and is provided with a plurality of tracks concentrically formed thereon. A video signal and an audio signal are each recorded on a different respective track.

The floppy disk 11 is rotated by a spindle motor 12 controlled by a spindle motor control circuit 13. A magnetic head 14 is moved radially over the floppy disk 11 by a tracking motor 15 controlled by a tracking motor control circuit 16. The magnetic head 14 may be positioned at a predetermined track of the floppy disk 11, whereby a recording-reproducing circuit 17 is able to record a desired video signal or audio signal in the track, or reproduce (play back) the video signal or audio signal. Alternatively, an erasing circuit 19 can erase a predetermined video signal or audio signal in the track. A monitor and speaker 18 are connected to the recording-reproducing circuit 17 for outputting an image and a sound.

A system controller 21 comprises, for example, a microcomputer, and controls the tracking motor control circuit 16, the recording-reproducing circuit 17, the erasing circuit 19 and an indication control circuit 22 so that an LCD (Liquid Crystal Display) 23 indicates predetermined information. In addition to these controls, the system controller 21 controls certain operations by which information is recorded in the floppy disk 11, information stored in the disk 11 is reproduced, and information is deleted from the disk 11.

A trigger switch, i.e., a release switch 32, an erasing trigger switch 38, an exposure correcting switch 31, a mode switch 33, a select switch 34, an "up" switch 35, a "down" switch 36, and a strobo-mode switch 37 are connected to the system controller 21. The trigger switch 32 is operated when starting and finishing the recording of a reproduction; the erasing trigger switch 38 is operated to start an erasing; the exposure correcting switch 31 is operated to carry out an exposure adjustment; the mode switch 33 and the select switch 34 are operated to select and set various modes such as recording, reproduction, and erasing; the up switch 35 and the down switch 36 are operated to increment and decrement a numeral indicated by the LCD 23; and the strobo-mode switch 37 is operated to input a predetermined strobo-mode to the system controller 21.

An operation of the embodiment is described below with reference to FIGS. 2A through 2D, which show examples of the indications by the LCD 23.

As shown in these drawings, various indications are made by the LCD 23. To assist in the selection of a mode, certain indications are caused to flicker in accordance with the selection and setting of the mode by mode switch 33 and select switch 34. To select a mode, the row of the indicator corresponding to that mode is selected by operation of mode switch 33 to cause a flickering (i.e., blinking light) indication to sequentially move vertically between respective rows of indicators located on the LCD display. Then, the mode is selected in that row by operation of select switch 34 which causes the flickering indication to move horizontally between respective mode indicators located within the particular selected row. Once a mode is selected, and the flickering indication is moved to another row on the LCD display, the selected indicator remains lit in a steady (i.e., non-blinking) condition.

For example, whenever the mode switch 33 is operated, a flickering indication is positioned sequentially at any one of a single mode indication (a rectangular indication in the drawings) denoting a mode for recording one frame image, a "REC" indication denoting a recording mode, a "NORMAL" indication denoting a normal mode, an "AUTO" indication of a white balance symbol "WB", and a 7-segment element displaying digits denoting a year, month and day, or hour, minutes and seconds.

Note, two kinds of normal modes exist; the "normal mode" in which a recording, a reproduction or an erasing of a video signal or an audio signal is carried out one track at a time, or a recording, a reproduction or an erasing of a video signal and an audio signal (an AV signal), is carried out for a pair of tracks provided for these signals, and a "normal successive recording/reproduction/erasing mode" in which, regardless of a distinction of an audio signal, a video signal, and an AV signal, a recording, a reproduction or an erasing is carried out sequentially for a plurality of tracks.

For example, when the single mode (rectangle) indication, located at the first row of the LCD, is caused to flicker, and as the select switch 34 is operated, successive indications located to the right of the single mode indication are sequentially caused to flicker, such as a self timer indication (a clock face in the drawings) for setting a self timer, a continuous photographing indication (shown in the drawings by three overlapping rectangles) showing a mode in which one, two, or five frame images are recorded per second, and digits "1", "2", and "5" showing the selected number of continuous photographing operations per second.

In the same way as described above, in an indication of the second line, "REC" denoting a recording mode, "PLAY" denoting a reproduction mode, and "ERASE" denoting an erasing mode, are selectively and sequentially indicated.

In the third row of the LCD in the drawings, "NORMAL" denoting the normal mode as described above in which an video signal or an audio signal is recorded, "A" denoting an audio mode in which an audio signal is recorded, reproduced or erased, and "V" denoting a video mode in which a video signal is recorded, reproduced or erased, may be selectively indicated. In an "AV" mode in which a video signal and an audio signal, which form a pair, are recorded, reproduced or erased, both "A" and "V" are indicated.

In a "WB" indication of the white balance shown in the fourth row of the LCD in the drawings, "AUTO" denoting an automatic mode, a Cloud indication (shown by a reproduction of a cloud in the drawings) denoting a cloudy weather mode, a Fine indication (shown by a reproduction of the sun in the drawings) denoting a fine weather mode, a Fluorescence Lamp indication (shown by a reproduction of a fluorescence lamp in the drawings) denoting a fluorescence lamp mode, and an Incandescent Lamp indication (shown by a reproduction of an incandescent lamp in the drawings) denoting an incandescent lamp, are sequentially selected.

In the fifth row of the LCD in the drawings, numerals denoting a date (or a time) are sequentially selected.

Note that an indication located at the left of the date shows the state of a battery, and is caused to flicker when the voltage of the battery is low. An indication located at the right of the date shows the state of a disk, i.e., shows whether or not a floppy disk is mounted in the still video device, and is always turned ON when a disk is mounted in the device.

Accordingly, by operating the mode switch 33 and the select switch 34, a flickering position is moved, whereby a command for a mode indicated by the flickering position is sent to the system controller 21. Note, an indication other than a mode which is selected is changed from a flickering condition to a steady light condition.

An operation of the strobo-mode switch 37 causes the "AUTO" indication, the "ON" indication, and the "OFF" indication to be sequentially lit.

When a recording mode is designated (whereby the "REC" indication is caused to flicker) and the trigger switch 32 is operated, the system controller 21 drives the spindle motor 12 through the spindle motor control circuit 13, and thus the floppy disk 11 is rotated. At the same time, the tracking motor 15 is driven through the tracking motor control circuit 16, and thus the magnetic head 14 is moved to a predetermined position at the tracks. The track position (i.e., the track number) is indicated by a double-digit display located at the: left of the "REC" indication. Thereafter, a predetermined video or audio signal is inputted to the magnetic head 14 through the recording-reproducing circuit 17, and thus the signal is recorded in the predetermined track of the floppy disk 11.

The recording-reproducing circuit 17 generates a code signal (i.e., a DPSK signal or a control code as described later) in accordance with a control signal outputted by the system controller 21, and supplies the code signal together with a predetermined video signal or audio signal to the magnetic head 14. These signals are then recorded in a predetermined track of the floppy disk 14. The code signal includes information representative of a track number, a recording mode, and so on, in the form of a DPSK signal when a video signal is recorded in the floppy disk, and in the form of a control code when an audio signal is recorded in the floppy disk. When recording is carried out in the AV mode, information denoting that the corresponding audio signal exists is included in the DPSK signal, or information denoting that the corresponding video signal exists is included in the control code. In this embodiment, an audio signal is recorded in an adjacent track which is positioned inward to the track in which the corresponding video signal is recorded.

Prior to this recording operation, when the exposure correcting switch 31 is operated during the recording mode, an exposure correcting indication "±EF" is caused to flicker, and an indication of the 7-segment element at the right of the exposure correcting indication is changed to an exposure correcting value designated at that time. When the up switch 35 or the down switch 37 is operated while the exposure correcting switch 31 is operated, the exposure correcting value is incremented or decremented. Then, when the exposure correcting switch 31 and the trigger switch 32 are operated at the same time, a photographing operation is carried out in a state in which an exposure is set to the correct value.

In a recording mode, if the continuous photographing mode is set, the continuous photographing indication (i.e., the symbol of overlapping rectangles) is lit and a numeral corresponding to the selected number of frames per second, among "1", "2", "5", caused to flicker. In this state, when the trigger switch 32 is operated, video signals of the selected numbers of frames per second are continuously recorded.

An erasing operation is described below with reference to flowcharts shown in FIGS. 3A through 3D.

When the normal mode is set by an operation of the mode switch 33 and the select switch 34, the "NORMAL" indication is lit (step S1), and then, when the erasing mode is set by an operation of the mode switch 33 and the select switch 34, the "ERASE" indication is caused to flicker (step S2). In this state, if the erasing trigger switch 38 is operated while the exposure correcting switch 31 is not operated (steps S3 and S4), the "ERASE" indication is changed from a flickering to a steady light condition (step S5). Thus the LCD 23 indicates a normal erasing mode as shown in FIG. 2A. Then, the floppy disk 11 is rotated by the spindle motor control circuit 13 and the spindle motor 12 (step S6), and the erasing circuit 19 is operated for one track of the floppy disk 11 (step S7) and then stopped (step S8). Thereafter, the spindle motor 12 is stopped (step S9), and thus the normal erasing operation is completed.

Figure 2B:
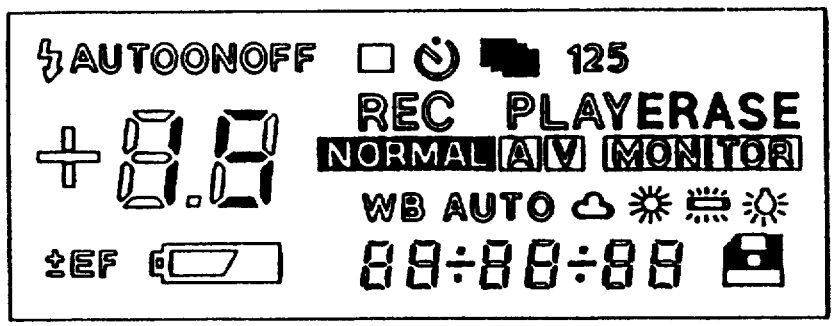
FIG. 2B is a view showing an indication by the LCD in a normal successive erasing operation for a video signal or an audio signal.

When the exposure correcting switch 31 is operated while the "ERASE" indication described above is flickering, the continuous photographing indication is lit (step S10). At this time, the "NORMAL" indication is lit, and the "ERASE" indication is caused to flicker (step S11). In this state, When the erasing trigger switch 38 is operated while the select switch 34 and the exposure correcting switch 31 are not operated (steps S12, S13 and S14), the "ERASE" indication is changed from a flickering condition to a steady light condition (step S15). Thus the LCD 23 indicates a normal successive erasing mode as shown in FIG. 2B. Then, the floppy disk 11 is rotated by the spindle motor 12 under the control of the spindle motor control circuit 13 (step S16), and the erasing circuit 19 is operated to erase one track of the floppy disk 11 (step S17) and stopped (step S18).

At this time, if the select switch 34 and the exposure correcting switch 31 are not operated (steps S19 and S20), and further if the track which has been operated upon is not the 50th track (i.e., the last track (step S21), the magnetic head 14 is radially moved inward by one track by the tracking motor 15 under the control of the tracking motor control circuit 16 (step S22). At this time, a track number indicated by the LCD 23 is incremented by one. Then, an erasing operation is carried out at a next track.

Figure 3A:
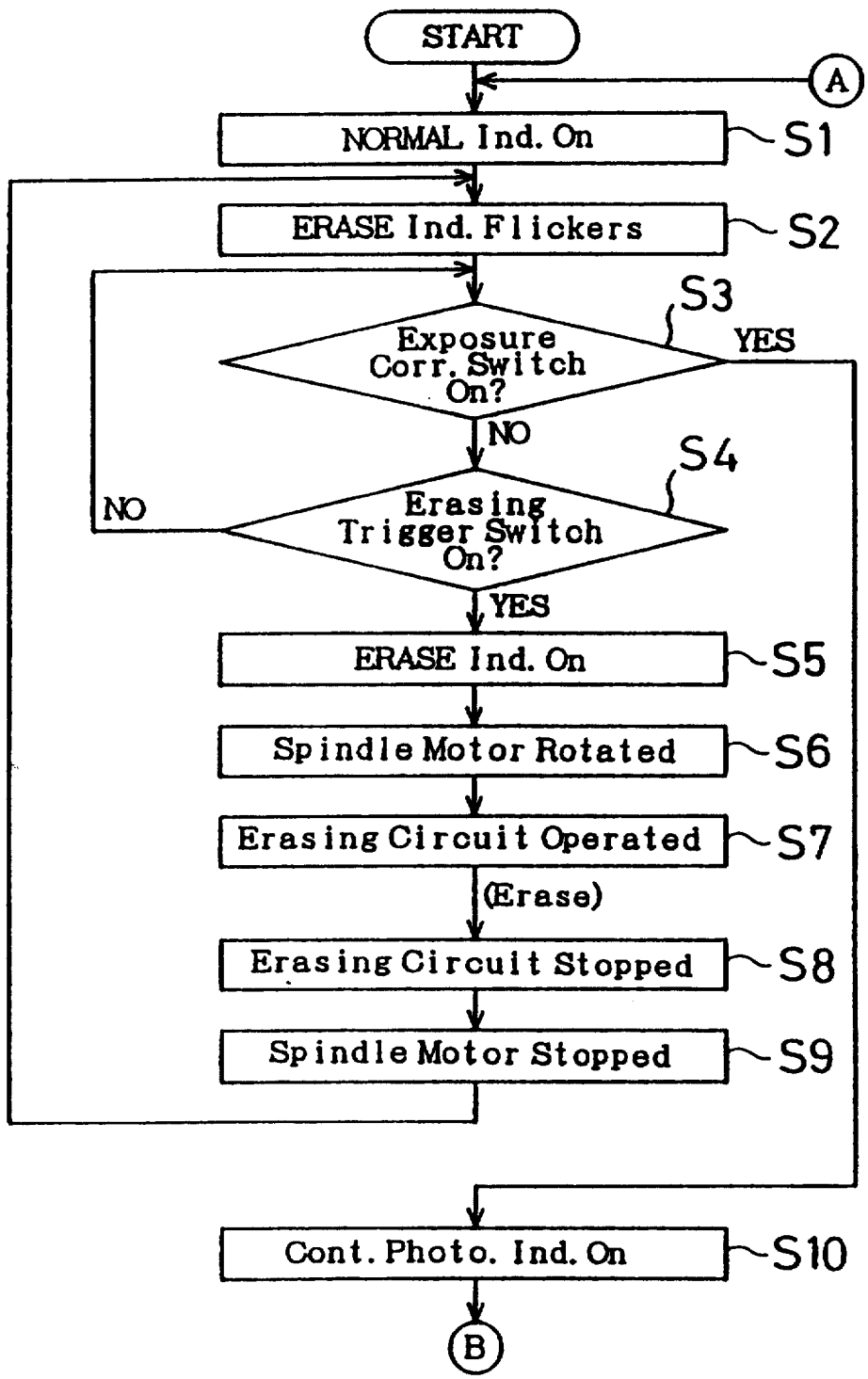
FIG. 3A is a flowchart showing the normal erasing operation.

During rotation of the spindle motor 12, and after an operation of the erasing circuit 19 is stopped (steps 516–518, if the exposure correcting switch 31 is operated (step S20), the spindle motor 12 is stopped (step S23) and the continuous photographing indication is extinguished (step S24). Then the process goes to the normal mode in which only one track is processed (FIG. 3A). If the exposure correcting switch 31 is operated (step S13) while the "ERASE" indication is flickering, the continuous photographing indication is extinguished (step S24), and the process goes to the normal mode in which only one track is processed (FIG. 3A).

During a rotation of the spindle motor 12, and after an operation of the erasing circuit 19 is stopped, if the select switch 34 is operated (step S19), the spindle motor 12 is stopped (step S25), and the "NORMAL" indication is extinguished (step S26). The process then goes to the video successive erasing mode (FIG. 3C). If the select switch 34 is operated (step S12) while the "ERASE" indication is flickering, the "NORMAL" indication is extinguished (step S26) and the process goes to the video successive erasing mode (FIG. 3C).

Figure 2C:
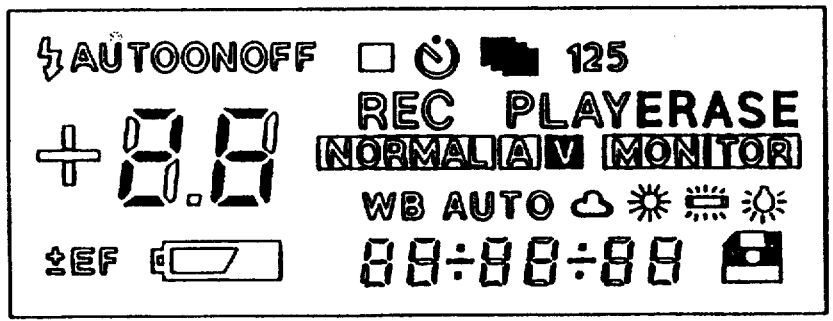
FIG. 2C is a view showing an indication by the LCD in a successive erasing operation for a video signal.

When the "V" indication is lit and the "ERASE" indication is caused to flicker (step S27 in FIG. 3C), if the erasing trigger switch 38 is operated while the select switch 34 and the exposure correcting switch 31 are not operated (steps S28, S29 and S30), the "ERASE" indication is changed from a flickering condition to a steady light condition (step S31). Thus, the LCD 23 indicates the video successive erasing mode as shown in FIG. 2C.

Then, the floppy disk 11 is rotated by the spindle motor 12 under the control of the spindle motor control circuit 13 (step S32), and thereafter, the recording/reproducing circuit 17 is operated (step S33).

A reproducing operation of the recording/reproducing circuit 17 is described below.

The system controller 21 reads information which denotes whether the track is storing only a video signal (a video mode) or only an audio signal (an audio mode), or whether the track is storing both a video signal and an audio signal, which form a pair (an AV mode). Such information is obtained from the recording/reproducing circuit 17, in accordance with a DPSK (differential-phase-shift-keying) signal or control data.

When the track recording mode is the AV mode, the magnetic head 14 is moved by the tracking motor control circuit 16 and the tracking motor 15 to an adjacent track, which is located inward from the previous track, and in which an audio signal is recorded. Thereafter, the track is reproduced, and the reproduced audio signal is compressed, i.e., the signal recording period is shortened, and temporarily stored in a memory housed in the recording/reproducing circuit 17. Then, the magnetic head 14 is moved to the track in which a video signal corresponding to the audio signal is recorded, and thus the video signal stored in the track is reproduced. This reproduced video signal is supplied to the monitor and speaker 18, and indicated by the monitor. At this time, the audio signal stored in the memory is expanded to the original period thereof and reproduced, and then outputted to the monitor and speaker Accordingly, the video signal, and the audio signal corresponding to the video signal, are outputted at the same time.

The AV reproduction is further discussed in commonly-assigned U.S. patent application Serial No. 07/268,303, the description of which is expressly incorporated herein in its entirety.

On the other hand, when the track mode is not the AV mode, if the recorded signal is an audio signal, the audio signal is once stored in the memory of the recording/reproducing circuit 17, and then is read and reproduced. Conversely, if the recorded signal is a video signal, the reproduced signal is supplied to the monitor and speaker 18 and displayed.

An operation of the recording/reproducing circuit 17 in the erasing mode is only acts to distinguish between the mode in which the track recorded, as described above. To be precise, the recording/reproducing circuit 17 in the erasing mode only determines whether a signal recorded in the track is a video signal or an audio signal. Therefore, after information denoting the track mode which is currently processed is inputted to the recording/reproducing circuit 17 (step S34), the operation of the recording/reproducing circuit 17 is stopped (step S35). If it is determined that a video signal is recorded in the currently processed track (step S36), the erasing circuit 19 is operated for the track (step S37), and the operation of the erasing circuit 19 is stopped (step S38).

At this time, if the select switch 34 and the exposure correcting switch 31 are not operated (steps S39 and S40), and further, if the track which has been operated is not the 50th track (i.e., the last track) (step S41), the magnetic head 14 is radially moved inward by one track by the tracking motor 15 under the control of the tracking motor control circuit 16 (step S42). At this time, a track number indicated by the LCD 23 is incremented by one. Then, after reproduction, track mode input, and stopping of reproduction (steps S33–S35) it is determined whether or not the track to which the magnetic head 14 has been moved is a video track (step S36). When the track is a video track, an erasing operation for the track is then carried out (steps S37 and S38). Thus, only video signals are erased over a plurality of tracks.

During rotation of the spindle motor 12, and after an operation of the erasing circuit 19 is stopped, if the exposure correcting switch 31 is operated (step S40), the spindle motor 12 is stopped (step S43), the continuous photographing indication and the "V" indication are extinguished (step S44), and then the process goes to the normal mode in which only one track is processed (FIG. 3A). If the exposure correcting switch 31 is operated (step S29) while the "ERASE" indication is flickering, the continuous photographing indication and the "V" indication are extinguished (step S44), and the process goes to the normal mode in which only one track is processed (FIG. 3A).

During rotation of the spindle motor 12, and after an operation of the erasing circuit 19 is stopped if the select switch 34 is operated (step S39). The spindle motor 12 is stopped (step S45) the "V" indication is extinguished (step S46), and Then, the process goes to the audio successive erasing mode (FIG. 3D). If the select switch 34 is operated (step S28) while the "ERASE" indication is flickering, the "V" indication is extinguished (step S46) and the process goes to the audio successive erasing mode (FIG. 3D).

Figure 2D:
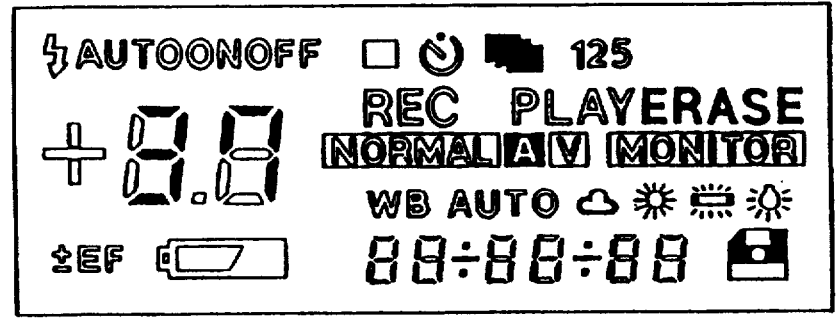
FIG. 2D is a view showing an indication by the LCD in a successive erasing operation for an audio signal.

When the "A" indication is lit and the "ERASE" indication is caused to flicker (step S47 in FIG. 3D), if the erasing trigger switch 38 is operated while the select switch 34 and the exposure correcting switch 31 are not operated (steps S48, S49 and S50), the "ERASE" indication is changed from a flickering condition to a steady light condition (step S51). Thus, the LCD 23 indicates the audio successive erasing mode as shown in FIG. 2D. Then, the floppy disk 11 is rotated by the spindle motor 12 under the control of the spindle motor control circuit 13 (step S52), and thereafter, the recording/reproducing circuit 17 is operated (step S53).

After information denoting the track mode of the track currently being processed is inputted to the recording/reproducing circuit 17 (step S54), the operation of the recording/reproducing circuit 17 is stopped (step S55). If it is determined that an audio signal is recorded in the currently processed track (step S56), the erasing circuit 19 is operated to erase the track (step S57), and the operation of the erasing circuit 19 is stopped (step S58).

At this time, if the select switch 34 and the exposure correcting switch 31 are not operated (steps S59 and S60), and further, if the track which has been operated is not the 50th track, (i.e., the last track) (step S61), the magnetic head 14 is radially moved inward by one track by the tracking motor 15 under the control of the tracking motor control circuit 16 (step S62). At this time, a track number indicated by the LCD 23 is incremented by one. Then, it is determined whether or not the track to which the magnetic head 14 has been moved is an audio track (step S56). When the track is an audio track, an erasing operation for the track is then carried out (steps S57 and S58). Thus, only audio signals are erased from a plurality of tracks.

During rotation of the spindle motor 12, and after an operation of the erasing circuit 19 is stopped, if the exposure correcting switch 31 is operated (step S60), the spindle motor 12 is stopped (step S63), the continuous photographing indication and the "A" indication are extinguished (step S64), and then the process goes to the normal mode in which only one track is processed (FIG. 3A). If the exposure correcting switch 31 is operated (step S49) while the "ERASE" indication is flickering, the continuous photographing indication and the "A" indication are extinguished (step S64) and the process goes to the normal mode in which only one track is processed (FIG. 3A).

Figure 3B:
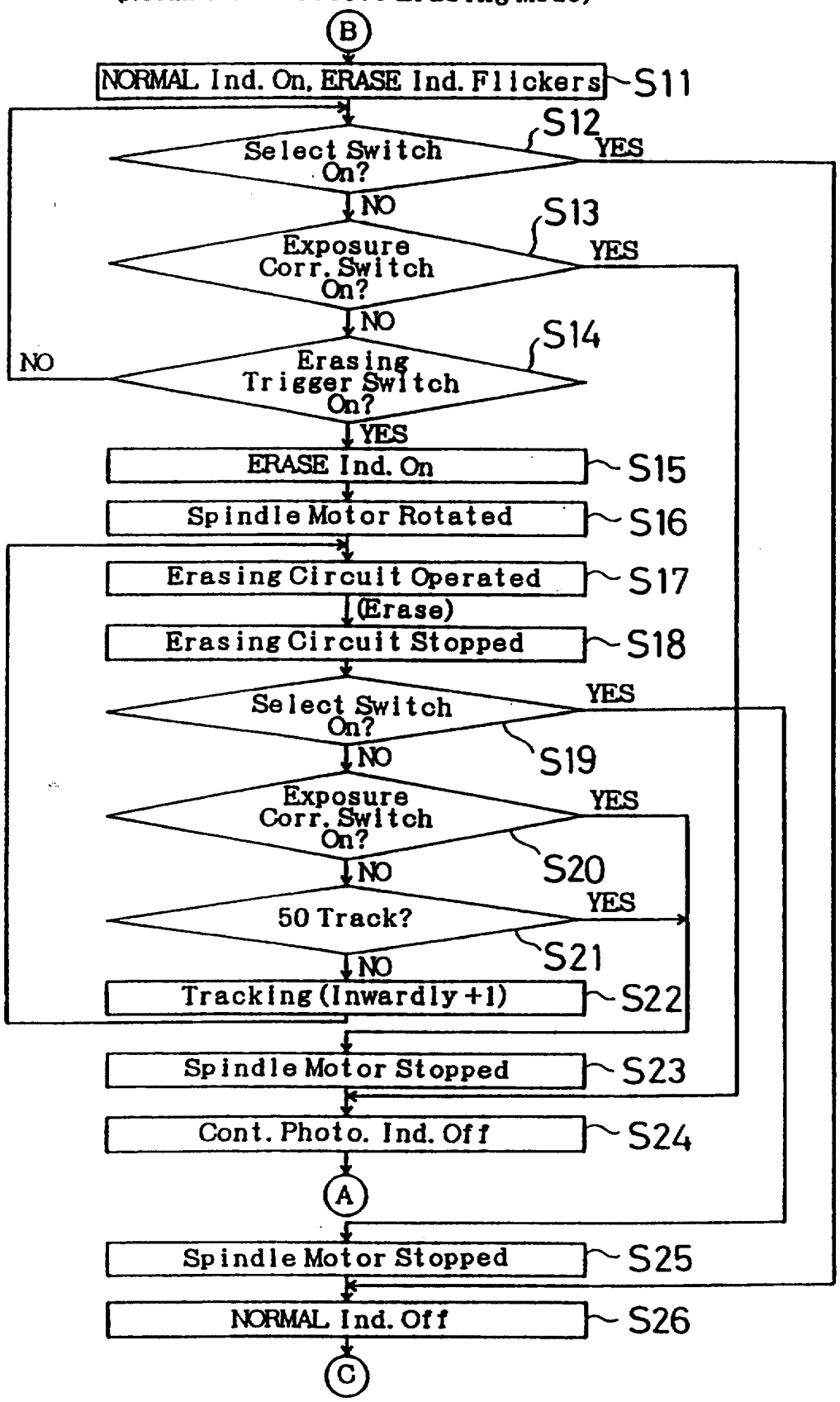
FIG. 3B is a flowchart showing the normal successive erasing operation.

During a rotation of the spindle motor 12, and after an operation of the erasing circuit 19 is stopped (step S58), if the select switch 31 is operated (step S59), the spindle motor 12 is stopped (step S65) and the "A" indication is extinguished (step S66), and then the process goes to the normal successive erasing mode (FIG. 3B). If the select switch 34 is operated (step S48) while the "ERASE" indication is flickering, the "A" indication is extinguished (step S66) and the process goes to the normal successive erasing mode (FIG. 3B).

Note, in the above embodiment, the exposure correcting switch 31, used for carrying out an exposure adjustment in a recording operation, is also used for switching from the audio successive erasing mode to the successive erasing mode, and the select switch 34, used for switching to other functions, is also used for switching the audio and video successive erasing modes. Exclusive switches can be provided for these purposes, but as shown in the above embodiment, the use of one switch for more than one operation prevents an increase of the number of parts, reduces the amount of electrical wiring, lowers costs, and maintains the compact size of the device.

Further, in the above embodiment, the continuous photographing indication denoting a continuous photographing in the recording mode is used for indicating the recording and reproduction, and the "A" indication and "V" indication used for denoting an audio signal and a video signal in the normal mode, respectively, are used for distinguishing the audio successive erasing mode and the video successive erasing mode. Exclusive indications denoting each mode separately may be provided, but this construction including the exclusive indications requires an increase in the size of the area of the LCD 23, which is disadvantageous,. Accordingly, indications are preferably used for a plurality denotations, as in the above-described embodiment.

Note that the erasing trigger switch 38 and the trigger switch 32 can be combined as one switch.

As described above, according to this embodiment, a successive erasing of only video signals and only audio signals can be carried out. Especially, the embodiment is effective when only one of a video signal and a audio signal is erased from tracks in which a recording operation has been carried out in the AV mode.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 2-136526 (filed on May 25, 1990) which is expressly incorporated herein by reference in its entirety.

I claim:

1. A still video device in which a recording medium is mounted, said recording medium having a plurality of tracks on which audio signals and video signals are recordable, said still video device comprising:

means for selecting a successive erasing mode;

means for erasing at least one of an audio signal and a video signal recorded at a predetermined track of said recording medium;

means for designating at least one of said audio signal and said video signal recorded in said recording medium that is to be erased;

means for controlling said erasing means to successively erase at least one of said audio signal and said video signal stored at a plurality of tracks which are designated by said designating means when said successive erasing mode is selected by said selecting means; and means for cancelling said successive erasing during an operation of said successive erasing mode.

2. The still video device of claim 1, wherein said erasing means comprises erasing tracks of said recording medium without recording new signals onto said recording medium.

3. The still video device of claim 1, said controlling means further comprising means for instructing said successive erasing mode to perform said successive erasing of tracks storing said at least one of said audio signal and said video signal.

4. The still video device of claim 1, further comprising means for displaying a first predetermined indication when said successive erasing mode is selected by said selecting means and for displaying a second predetermined indication when a non-successive erasing mode, in which each track of said recording medium is non-successively erased, is selected.

5. The still video device of claim 1, wherein said at least one of said audio signal and said video signal comprises an audio signal and a video signal recorded in an audio/video mode.

6. The still video device of claim 5, wherein said erasing means erases tracks in said successive erasing mode that store only one of said audio signal and said video signal.

7. The still video device of claim 1, wherein said recording medium comprises a magnetic disk.

8. The still video device of claim 7, wherein said magnetic disk comprises a floppy disk.

9. The still video device of claim 7, wherein said plurality of tracks are concentrically formed on said magnetic disk.

10. The still video device of claim 7, wherein said at least one of said audio signal and said video signal comprises an audio signal and a video signal, said plurality of tracks comprising at least one track containing audio signals and at least one track containing video signals recorded thereon.

11. The still video device of claim 7, wherein said designating means comprises a mode switch and a select switch, said mode switch comprising means for selecting one of a plurality of still video device control modes, said still video device control modes comprising a first mode in which said select switch can be operated to select a successive mode and a second mode in which said select switch can be operated to select an erasing mode, said select switch being operable to select between a normal mode, an audio mode, and a video mode, wherein when one of said normal mode, audio mode, and video mode is selected, said at least one of said audio signal and said video signal is designated.

12. A still video device, comprising:

a disk having a plurality of tracks in which audio signals and video signals are recordable;

means for erasing at least one of an audio signal and a video signal recorded on said disk;

means for moving said erasing means to a predetermined track of said disk;

a first switch that is operable to initiate a successive erasing mode, in which several tracks of said disk are successively erased;

a second switch that is operable to designate at least one of said audio signal and said video signal recorded on said disk to be erased;

means for controlling said moving means to successively position said erasing means at a plurality of tracks to successively erase said at least one of said audio signal and said video signal designated by said second switch when said successive erasing mode is initiated by said first switch; and means for cancelling said successive erasing during an operation of said successive erasing mode.

13. The still video device of claim 12, wherein at least one of said first and second switches is also operable to initiate a non-successive erasing mode in which each track of said disk is non-successively erased.

14. The still video device of claim 12, further comprising means for displaying a first predetermined indication when said still video device is in said successively erasing mode and for displaying a second predetermined indication when said still video device is in a non-successive erasing mode in which each track of said disk is non-successively erased.

15. The still video device claim 12, wherein said at least one of said audio signal and said video signal comprises an audio signal and a video signal recorded in an audio/video mode.

16. The still video device of claim 12, wherein a signal that is different from said at least one of said audio signal and said video signal is erased if said second switch is operated during said successive erasing mode.

17. The still video device of claim 12, wherein said erasing means comprises erasing tracks of said disk without recording new signals onto said disk.

18. The still video device of claim 12, further comprising a third switch that operates said cancelling means.

19. The still video device of claim 18, wherein said cancelling means erases less than all of said several tracks.

20. A still video device employing a disk having a plurality of tracks on which various signals are recordable, said signals being erased by a head associated with said still video device that is movable to a predetermined track to erase said signals on said predetermined track, comprising:

a first switch that is operable to select a successive erasing mode in which several tracks of said disk are successively erased;

a second switch that is operable to designate at least one of an audio signal and a video signal recorded on said disk that is to be erased;

means for moving said head track by track along said disk so that said head is successively positioned at predetermined tracks where only said at least one of said audio signal and said video signal designated by said second switch are erased when said successive erasing mode is selected by said first switch; and means for cancelling said successive erasing during an operation of said successive erasing mode.

21. The still video device of claim 20, herein said erasing means comprises erasing tracks on said disk without recording new signals onto said disk.

22. A still video device for recording audio signals and video signals to a recording medium having a plurality of tracks, comprising:

means for selecting a successive erasing mode;

means for designating at least one of an audio signal and a video signal that is to be erased at a predetermined track;

means for controlling a successive erasing of at least one of said audio signal and said video signal stored at a plurality of tracks designated by said designating means when said successive erasing mode is selected by said selecting means; and means for cancelling said successive erasing during an operation of said successive erasing mode.

23. The still video device of claim 22, further comprising means for displaying a first predetermined indication when said successive erasing mode is selected by said selecting means and for displaying a second predetermined indication when a non-successive erasing mode, in which each track of said recording medium is non-successively erased, is selected by said selecting means.

24. The still video device of claim 22, wherein said at least one of said audio signal and said video signal comprises an audio signal and a video signal recorded in an audio/video mode.

25. The still video device of claim 22, wherein said designating means comprises a mode switch and a select switch, said mode switch comprising means for selecting one of a plurality of still video device control modes, said still video device control modes comprising a first mode in which said select switch can be operated to select a successive mode and a second mode in which said select switch can be operated to select an erasing mode, said select switch being operable to select between a normal mode, an audio mode, and a video mode, wherein when one of said normal mode, audio mode, and video mode is selected, said at least one of said audio signal and said video signal is designated.

26. The still video device of claim 22, wherein said recording medium comprises a recording disk, and said plurality of tracks comprises a plurality of concentrically formed tracks formed on said recording disk.

27. The still video device of claim 26, wherein said at least one of said audio signal and said video signal comprises an audio signal recorded on at least one track of said plurality of tracks, and a video signal recorded on at least one track of said plurality of tracks.

28. The still video device of claim 22, further comprising means for initiating a non-successive erasing mode in which each track of said disk is non-successively erased.

29. The still video device of claim 28, further comprising means for displaying a first predetermined indication when said successive erasing mode is selected by said selecting means and for displaying a second predetermined indication when said non-successive erasing mode is selected by said selecting means.

30. The still video device of claim 22, wherein said recording medium comprises a magnetic disk.

31. The still video device of claim 30, wherein said plurality of tracks are concentrically formed on said magnetic disk.

32. The still video device of claim 30, wherein said magnetic disk comprises a floppy disk.

* * * * *

UNITED STATES PATENT AND TRADEMARK OFFICE
CERTIFICATE OF CORRECTION

PATENT NO. : 5,339,199
DATED : August 16, 1994
INVENTOR(S) : Kimiaki OGAWA

It is certified that error appears in the above-indentified patent and that said Letters Patent is hereby corrected as shown below:

At column 12, line 1 (claim 21, line 1), change "herein" to ---wherein---.

Signed and Sealed this

Sixteenth Day of May, 1995

Attest:

BRUCE LEHMAN

Attesting Officer · Commissioner of Patents and Trademarks